Figure 1:
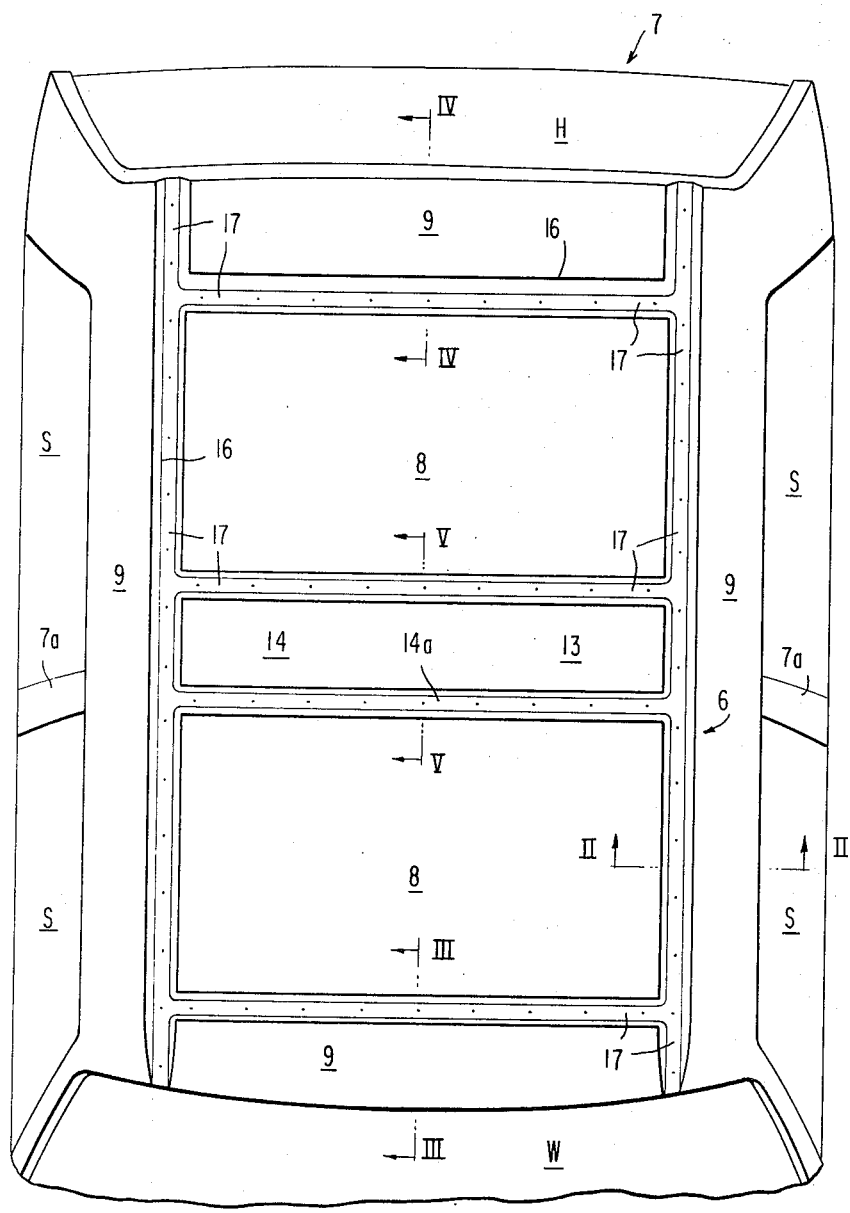
Figure 2:
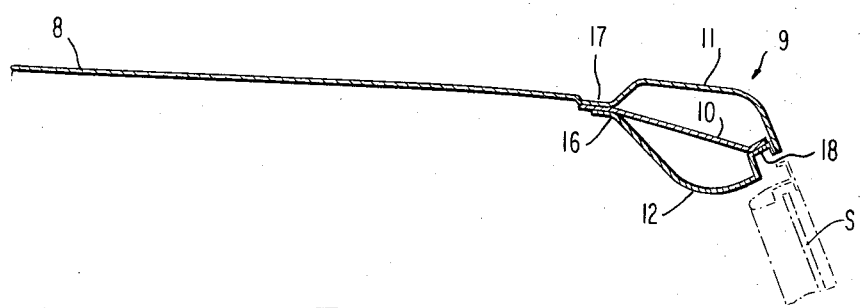
Figure 3:
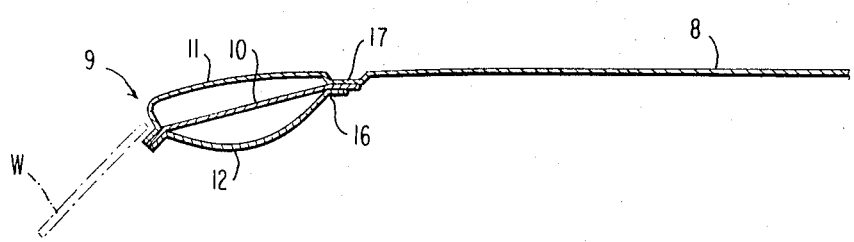
Figure 4:
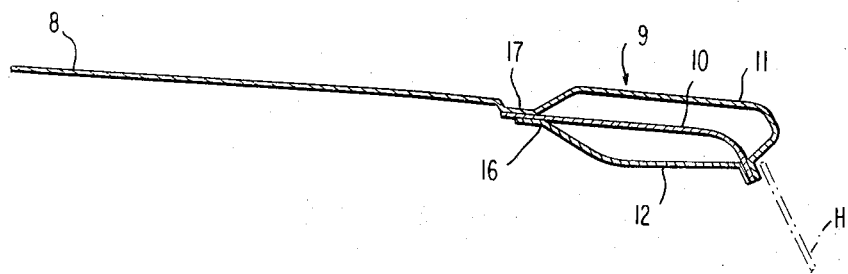

United States Patent
Renner

[11] 3,833,254
[45] Sept. 3, 1974

[54] MOTOR VEHICLE ROOF
[75] Inventor: Hermann Renner, Magstadt, Germany
[73] Assignee: Daimler-Benz Aktiengesellschaft, Stuttgart, Germany
[22] Filed: Dec. 6, 1972
[21] Appl. No.: 312,513

[30] Foreign Application Priority Data
Dec. 7, 1971  Germany............................ 2160537

[52] U.S. Cl............................................. 296/137 R
[51] Int. Cl............................................. B60j 91/00
[58] Field of Search...................... 296/137 R, 28 R

[56] References Cited
UNITED STATES PATENTS
3,080,189  3/1963  Barenyi............................ 296/28 R
3,199,912  8/1965  Peras............................... 296/137 R
3,528,699  9/1970  Wessells........................... 296/28 R

*Primary Examiner*—Robert R. Song
*Attorney, Agent, or Firm*—Craig & Antonelli

[57] ABSTRACT

A motor vehicle roof with a covering panel provided with longitudinal and/or transverse beads or reinforcing seams and with a double-walled hollow roof frame formed partially by the edge of the roof covering panel; the roof frame forms a roof preferably extending peripherally along the rood edge while a web extends through the bearer which is connected with its edges.

36 Claims, 5 Drawing Figures

MOTOR VEHICLE ROOF

The present invention relates to a motor vehicle roof, especially of passenger motor vehicles, with a flat or slightly curved sheet metal roof covering which includes longitudinal and/or cross beads or reinforcing seams, and with a double-walled hollow roof frame partially formed by the edge of the sheet metal covering.

The roof is secured by means of the roof frame constructed as bearer part at the upwardly extending columns or pillars and wall parts of the vehicle body. For increasing the form-rigidity of the roof and for achieving a load-carrying ability of the roof, the roof frame is constructed as hollow body and, in order to maintain an unobstructed interior height and door height, projects upwardly beyond the usual roof height.

The problem leading to the present invention resides in achieving a roof rigidity which is as large as possible for safeguarding the vehicle passengers. As solution to the underlying problem, the roof frame hollow space forms a bearer extending preferably peripherally along the roof edge, which bearer is traversed by a web connected with its edges. This web strengthens and reinforces the roof frame.

The inner parts of the bearer, according to a further feature of the present invention, are connected with each other approximately in the center of the roof by an at least double-walled cross bearer. Additionally, the roof is provided in the longitudinal and cross direction with bead-like steps and the bearer parts are connected with each other at the bead-like steps by welding or gluing.

A completely satisfactory assembly can take place by this arrangement of the longitudinal and cross bead-like reinforcing seams at the roof-side ends of the centrally reinforced rectangular frame of the roof because the bead-like reinforcing seams serve as fitting forms so that the individual parts can be correctly connected with each other within the same. The assembly and fastening of the reinforcing frame of the roof, satisfactory as regards fit, is thus realizable without any further difficulties and without any impairment of the roof cover panel. A warping or distortion of the roof cover panel cannot occur during the assembly due to the location of the welding points in the channel bottoms of the beads or reinforcing seams. Additionally, the roof cover panel can also be adhesively bonded or glued uniformly at the bottom sides of the bead-like reinforcing seams.

The web of the roof frame consisting of two shells open with respect to one another forms the center wall of the hollow roof frame and may consist each of one edge strip of the roof sheet metal covering. This web can also be arranged in the plane of the roof termination offset by the depth of the bead or reinforcing seam; however, the web may also extend obliquely through the roof frame in the upward or downward direction. Furthermore, the edges of the web can be bent off or cranked in the bearer part and may form, together with the edge portions of the shells, a reinforcement of the door frame.

Preferably the forward edge of the center cross bearer is arranged with the transverse bead-like reinforcing seam of the roof cover panel approximately in the center of the center column of the vehicle body in order to obtain a sufficient head clearance for the driver and co-driver whose seats are frequently adjustable for the purpose of good driving visibility.

The center cross bearer consists advantageously also of two shells secured at one another, of which the upper shell is constructed as a part of the roof cover panel in the plane thereof; the lower shell may then be slightly curved.

The advantages of the roof construction according to the present invention are not limited to sheet metal roofs. In a similar advantageous manner, the present invention can be applied to synthetic plastic roofs or to loadable vehicle roofs covered with layers of synthetic plastic material of any known type such as of conventional synthetic resinous material; the synthetic plastic roof may be provided for purposes of soundproofing or as light protection.

The pair of beads or reinforcing seams can be equipped as ladder struts with mounting or holding means for luggage, skis or the like.

Accordingly, it is an object of the present invention to provide a vehicle roof, especially of passenger motor vehicles, which avoids by simple means the aforementioned shortcomings and drawbacks encountered in the prior art.

Another object of the present invention resides in a vehicle roof which offers greatest possible roof-rigidity for safeguarding the vehicle passengers.

Still another object of the present invention resides in a roof which is simple in construction and can be easily and accurately assembled.

A further object of the present invention resides in a vehicle roof, especially of passenger motor vehicles which can be readily assembled in such a manner as to provide an accurate fit of the various parts.

Still a further object of the present invention resides in a vehicle roof in which warping or distortion is eliminated when utilizing spot-welding for the connection of the various parts thereof.

Another object of the present invention resides in a vehicle roof which offers great safety for the passengers yet assures also sufficient head clearance.

These and further objects, features and advantages of the present invention will become more apparent from the following description when taken in connection with the accompanying drawing which shows, for purposes of illustration only, one embodiment in accordance with the present invention, and wherein:

FIG. 1 is a plan view on a roof of a motor vehicle body of a passenger motor vehicle with the front portion thereof cut away; and FIGS. 2 – 5 are, respectively, cross-sectional views taken along lines II—II, III—III, IV—IV and V—V of the body according to FIG. 1.

Referring now to the drawing wherein like reference numerals are used throughout the various views to designate like parts, the vehicle roof generally designated by reference numeral 6 of the motor vehicle body generally designated by reference numeral 7 (FIG. 1) is constructed essentially flat or slightly convexly curved. It consists of an approximately rectangularly shaped sheet metal covering 8 which with its narrow sides receives the windshield pane W (FIG. 3) and the rear windowpane H (FIG. 4), while the side window panes S are supported at the longitudinal sides thereof.

The one-piece or unitary sheet metal covering 8 forming the outer roof cover panel is surrounded or enclosed along its entire circumference by a double-shell frame 9 which is rigidly connected at the corners with the front and rear columns as well as at the longitudinal sides with the center columns 7a of the vehicle body 7. A web 10 (FIGS. 2 to 4) which extends through the roof frame 9, is secured at the upper frame shell 11 and at the lower shell 12 between the shells 11 and 12 and thus forms a bearer extending along the roof edge about the entire circumference of the roof.

Figure 5:
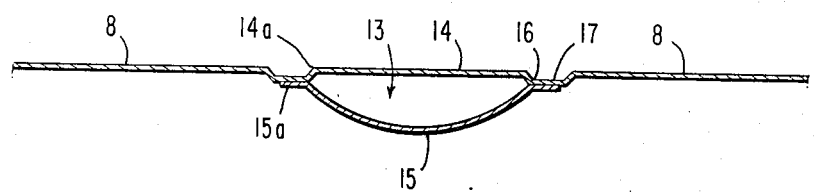

The frame 9 is reinforced approximately in its longitudinal center by a cross bearer generally designated by reference numeral 13 which is of double-shell construction (FIGS. 1 and 5). A cross strip of the outer covering 8 serves as upper flat shell 14, at which is secured from below a somewhat more strongly curved shell strip 15 (FIG. 5). The forward ends 14a and 15a of the two shell srips 14 and 15 are aligned approximately in the plane of the center column 7a of the vehicle body; the rear ends of the shell strips 14 and 15, in contradistinction thereto, are arranged offset toward the vehicle rear end with respect to the plane of the center columns 7a.

One longitudinal bead-like reinforcing seam 17 each is embossed at the roof-side end 16 of each frame, also in the center cross bearer 13, for the connection of the roof frame 9 with the covering 8; the longitudinal bead-like reinforcing seams 17 form together with the corresponding cross bead-like reinforcing seams 17 a ladder-type connection. The bead-like reinforcing seam 17 is embossed in each case into the respective edge portion of the roof covering 8 forming the outer shell 11 of the roof frame 9, and more particularly into the roof-side end of the roof frame 9.

The web 10 abuts at the lower surface of each bead-like reinforcing seam 17 of the roof covering 8 and extends through the roof frame 9. Additionally, each web forms together with the correspondingly constructed outer ends of the two shells 11 and 12 a reinforcement 18 (FIG. 2) for the fixed door frame at the pair of longitudinal bead-like reinforcing seams serving as struts of the ladder connection 17 by means of an external offset or cranking. The outwardly bent-off ends of each web 10 reinforce at the forward and rear end of the roof covering 8 the fixed opening frame for the windshield W and the rear window H.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A motor vehicle roof having a cover panel means provided with bead-like reinforcing seam means and having a double-walled hollow roof frame means formed in part by the edge of the cover panel means, characterized in that the roof frame means forms a bearer means extending along the roof edge and includes shell means, and web means connected with the edges of the bearer means and extending through the bearer means are provided, the edges of the web means are cranked in the bearer means and together with the edge portions of the shell means form a reinforcement for a door frame.

2. A motor vehicle roof according to claim 1, characterized in that the bead-like reinforcing seams extend in the longitudinal direction.

3. A motor vehicle roof according to claim 2, characterized in that the bead-like reinforcing seam means extend in the cross direction.

4. A motor vehicle roof according to claim 3, characterized in that the bearer means extends substantially peripherally about the entire roof.

5. A motor vehicle roof according to claim 1, characterized in that the inner parts of the bearer means are connected with each other approximately in the center of the roof by an at least double-walled cross bearer.

6. A motor vehicle roof according to claim 5, characterized in that the roof is provided with bead-like steps in at least one of the longitudinal and cross directions.

7. A motor vehicle roof according to claim 6, characterized in that the roof is provided with bead-like steps in both the longitudinal and cross direction.

8. A motor vehicle roof according to claim 6, characterized in that the parts of the bearer means are connected with each other at the bead-like steps.

9. A motor vehicle roof according to claim 8, characterized in that the bearer parts are connected with each other at their bead-like steps by welding.

10. A motor vehicle roof according to claim 8, characterized in that the bearer parts are connected with each other at the bead-like steps by gluing.

11. A motor vehicle roof according to claim 8, characterized in that the web means is arranged in the hollow roof frame approximately horizontally.

12. A motor vehicle roof according to claim 8, characterized in that the web means is arranged in the hollow frame means extending obliquely outwardly.

13. A motor vehicle roof according to claim 8, characterized in that the web means is arranged in the hollow frame means extending downwardly at an inclination in the outward direction.

14. A motor vehicle roof having a cover panel means provided with bead-like reinforcing seam means and having a double-walled hollow roof frame means formed in part by the edge of the cover panel means, characterized in that the roof frame means forms a bearer means extending along the roof edge and includes shell means, and in that the edges of the web means are cranked in the bearer means and together with the edge portions of the shell means form a reinforcement for a door frame, and in that the inner parts of the bearer means are connected with each other approximately in the center of the roof by an at least double-walled cross-bearer, and in that the roof is provided with bead-like steps in at least one of the longitudinal and cross directions with the parts of the bearer means connected with each other at the bead-like steps.

15. A motor vehicle roof according to claim 14, characterized in that at least portions of the roof essentially consist of synthetic plastic material.

16. A motor vehicle roof according to claim 14, characterized in that means for mounting a ski or luggage carrier are provided at the bead-like steps in the longitudinally extending bearer portion.

17. A motor vehicle roof according to claim 15, characterized in that the surface of the roof is provided with a layer of synthetic plastic material.

18. A motor vehicle roof according to claim 15, characterized in that the surface of the bearer means is provided with a layer of synthetic plastic material.

19. A motor vehicle roof according to claim 15, characterized in that the surface of the bead-like steps is provided with a layer of synthetic plastic material.

20. A motor vehicle roof according to claim 19, characterized in that the bead-like reinforcing seams extend in the longitudinal direction.

21. A motor vehicle roof according to claim 20, characterized in that the bead-like reinforcing seam means extend in the cross direction.

22. A motor vehicle roof according to claim 21, characterized in that the bearer means extends substantially peripherally about the entire roof.

23. A motor vehicle roof according to claim 22, characterized in that the roof is provided with bead-like steps in both the longitudinal and cross direction.

24. A motor vehicle roof according to claim 1, characterized in that the bead-like reinforcing seam means extend in the cross direction.

25. A motor vehicle roof according to claim 1, characterized in that the roof is provided with bead-like steps in at least one of the longitudinal and cross directions.

26. A motor vehicle roof according to claim 25, characterized in that the roof is provided with bead-like steps in both the longitudinal and cross direction.

27. A motor vehicle roof according to claim 25, characterized in that the parts of the bearer means are connected with each other at the bead-like steps.

28. A motor vehicle roof according to claim 1, characterized in that the web means is arranged in the hollow roof frame approximately horizontally.

29. A motor vehicle roof according to claim 1, characterized in that the web means is arranged in the hollow frame means rising obliquely outwardly.

30. A motor vehicle roof according to claim 1, characterized in that the web means is arranged in the hollow frame means extending downwardly at an inclination in the outward direction.

31. A motor vehicle roof according to claim 1, characterized in that the frame means includes shell means and in that the edges of the web means are cranked in the bearer means and together with edge portions of the shell means form a reinforcement for a door frame.

32. A motor vehicle roof according to claim 1, characterized in that at least portions of the roof essentially consist of synthetic plastic material.

33. A motor vehicle roof according to claim 32, characterized in that the surface of the roof is provided with a layer of synthetic plastic material.

34. A motor vehicle roof according to claim 32, characterized in that the surface of the bearer means is provided with a layer of synthetic plastic material.

35. A motor vehicle roof according to claim 32, characterized in that the surface of the bead-like steps is provided with a layer of synthetic plastic material.

36. A motor vehicle roof according to claim 25, characterized in that means for mounting a ski or luggage carrier are provided at the bead-like steps in the longitudinally extending bearer portion.

* * * * *